United States Patent [19]

Nakayama

[11] Patent Number: 4,826,058
[45] Date of Patent: May 2, 1989

[54] DRINK CONTAINER HOLDER
[75] Inventor: Hiromichi Nakayama, Yokohama, Japan
[73] Assignee: Nifco, Inc., Yokohama, Japan
[21] Appl. No.: 116,296
[22] Filed: Nov. 4, 1987
[30] Foreign Application Priority Data
Nov. 6, 1986 [JP] Japan .............................. 61-169622[U]
[51] Int. Cl.[4] ............................ B60N 3/10; B60R 9/10
[52] U.S. Cl. ................................ 224/42.44; 224/275;
224/281; 248/311.2; 296/37.12; 296/37.15
[58] Field of Search ............... 224/148, 275, 281, 282,
224/42.42, 42.44, 42.45 R; 312/274, 329;
248/311.2, 315; 296/37.12, 37.15, 37.16

[56] References Cited
U.S. PATENT DOCUMENTS
2,926,879  3/1960  Dietrich ......................... 248/311.2
3,606,112  9/1971  Cheshier ......................... 224/42.44
4,248,397  2/1981  Casper ........................... 248/311.2

Primary Examiner—Henry J. Recla
Assistant Examiner—Casey Jacyna
Attorney, Agent, or Firm—Schwartz & Weinrieb

[57] ABSTRACT

A drink container holder comprises a storage case built within the body of an automobile, a base framework having an annularly perforated portion able to enter and leave the storage case, an annular holding framework disposed within the perforated portion of the base framework, an intermediate swingable body interposed between the base framework and the holding framework and pivotably attached to the base framework and the holding framework respectively, and a cup holding frame pivotably attached to the holding framework in a suspended fashion.

17 Claims, 3 Drawing Sheets

DRINK CONTAINER HOLDER

FIELD OF THE INVENTION

This invention relates to a holder for a drink container for use within the interior of an automobile.

BACKGROUND OF THE INVENTION

Heretofore, sight-seeing buses and the like have been equipped with drink container holders disposed upon the back of the seats. Many conventional holders of this type comprise a metallic wire bent into a basket shape. Some are collapsible. Most are fixedly mounted upon the back of the seat and are always exposed.

A drink container holder of this type is used for holding a cup so that it does not fall, and is very convenient. However, the holder, when not is use, is bothersome since it occupies a part of the narrow space defined between the seats. Moreover, since the conventional holder is mounted in a projecting fashion, it may be dangerous.

OBJECTS OF THE INVENTION the present invention has been accomplished so as to eliminate the above-mentioned problems.

It is therefore an object of the present invention to provide a drink container holder which is mounted, for example, somewhere within the dash board of an automobile and is, when not in use, stowed within a storage case embedded within the dash board in order to prevent any danger from its projection into the automobile interior so as to avoid potentially dangerous situations, and is, when in use, moved out of the storage case so as to support an upright cup filled with a beverage.

Another object of the invention is to provide a drink container holder within which the framework for holding a drink container such as a cup can be collapsed a flattened state so that the holder can be stowed within a small storage case, thus enabling the mounting space to be as small as possible.

A further object of the present invention is to provide a drink container holder which, when in use, can be moved out of a storage case and set up such that the cup holding frame of the holding framework for holding a cup is always maintained in its vertical posture by means of its own weight and by means of the weight of the cup so as to effectively prevent the contents from spilling out of the cup due to swaying or inclination of the vehicle body.

SUMMARY OF THE INVENTION

In order to achieve the above-mentioned objects, a holder of the present invention comprises a storage case built within the body of an automobile, a base framework having an annula perforated portion or disk plate mounted upon a storage auxiliary member or door of the storage case, an annular holding framework stored within the perforated portion of the base framework, an intermediate swingable body interposed between the base framework and the holding framework, the intermediate swingable body including first and second pairs of pivotably attaching portions, the first pair of pivotably attaching portions being provided at opposing positions upon a first straight line or axis, the second pair of pivotably attaching portions being provided at opposing positions upon a second straight line or axis crossing the first straight line or axis at a central portion thereof and at right angles thereof, the first and second pairs of pivotably attaching portions being pivotably attached to the base framework and the holding framework respectively, and a cup holding frame having a pair of pivotably attaching portions at opposing end portions thereof and pivotably attached to the holding framework in a hanging or suspended fashion by pivotably attaching the pivotably attaching shafts thereto, the cup holding frame, when stowed within the storage case by means of the closing action of the storage auxiliary member or door closure, being pivoted about the pivotably attaching portions and stowed within the storage case.

As described in the foregoing, the holder of the present invention is collapsed a flattened state and stored within the storage case embedded within the dash board or the like of the automobile. Accordingly, good appearance can be obtained. In addition, potentially dangerous conditions caused by means of the outward projection of the holder can be avoided.

Moreover, since the container is always maintained in its vertically suspended posture by means of its own weight, the contents will not spill out of the container even when the vehicle body is inclined.

BRIEF DESCRIPTION OF THE DRAWINGS

The above and other objects and features of the invention will become more apparent from the following detailed description with reference to the accompanying drawings wherein.

DETAILED DESCRIPTION OF THE ILLUSTRATED EMBODIMENTS

Figure 1:
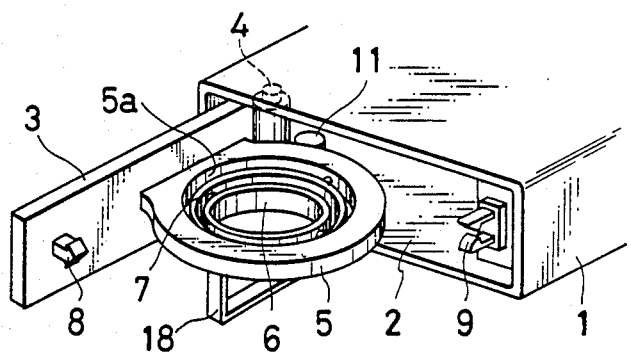
FIG. 1 is a perspective view showing one embodiment of a drink container holder according to the present invention.
Figure 2:
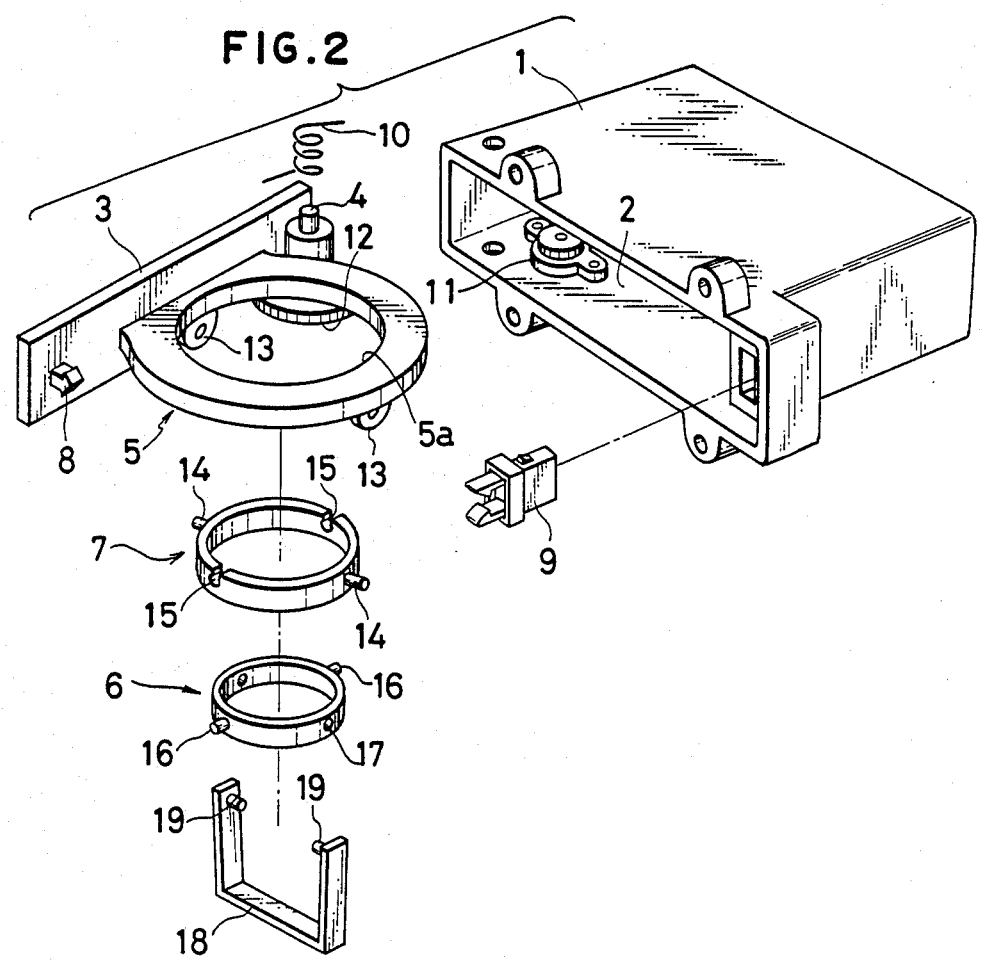
FIG. 2 is an exploded perspective view of the holder of FIG. 1.

FIGS. 1 and 2 illustrate a first embodiment of a drink container holder according to the present invention. In the figures, 1 denotes a storage case embedded within a suitable part of a dash board of an automobile and having an opening portion 2 facing an interior portion of the automobile passenger compartment, 3 denotes a door serving as a storage auxiliary member pivotably supported by means of a pivotable attaching shaft 4 disposed within the opening portion 2 so that it can be opened and closed, 5 denotes a base framework forming the holder, 6 denotes a holding framework, and 7 denotes an intermediate pivotable body interposed between the base framework 5 and the holding framework 6.

The door or closure 3 is opened and closed by swinging the same around the pivotal attaching shaft 4 serving as a supporting point and is maintained in its closed position by pushing a retaining projection 8 formed at end thereof into a catch 9 provided upon the distal side of the opening portion 2. A second pushing force causes the catch 9 to release the door 3 so that the door 3 can be opened.

In the figures, 10 denotes a spring which is wound around the pivotal attaching shaft 4 in order to normally bias the door 3 in the opening direction, and 11 denotes a damper which is meshed with a gear 12 mounted upon the pivotal attaching shaft 4 in order to restrict sudden movements of the door or closure when the door 3 is opened or closed.

The base framework 5 in this embodiment is disposed at the rear or inward surface portion of the door 3 and is integral with the door 3. The base framework 5 has an annular shape with a circular hole at the central portion thereof and is provided with a pair of shaft bearing portions 13 at two diametrically opposed locations upon the under-surface thereof with the central portion therebetween.

The intermediate swingable body 7 has a short cylindrical shape of a suitable size for being accommodated within the circularly perforated portion or through-bore 5a of the base framework 5. The intermediate swingable body 7 is provided with a pair of diametrically opposed outwardly extending pivotable attaching portions or trunnion pins 14 and another pair of diametrically opposed slots 15, the first pair of pivot pins 14 being disposed upon a first straight line or axis, and the second pair of slots 15 being disposed upon a second straight line or axis crossing the first straight line or axis at the center of the intermediate swingable body 7 and at right angles thereto.

In this embodiment, the first pair of pivotably attaching pins or trunnions 14 are pivotably attaching shafts projecting in the radial direction from the outer peripheral surface of the body 7 and fit into the corresponding shaft bearing portions 13 of the base framework 5, whereas the second pair of pivotably attaching slots 15 are recessed bearing portions which are formed by cutting the body 7 so as to form notches therein.

The holding framework 6 is accommodated within the intermediate swingable body 7 and has a short cylindrical shape similar to the intermediate swingable body 7. Likewise, the framework 6 is provided with a pair of diametrically opposed pivotably attaching pins or trunnions 16 and another pair of diametrically opposed pivotably attaching apertures 17, the first pair of pins 16 being disposed upon a first straight line or axis, and the second pair of apertures 17 being disposed upon a second straight line or axis crossing the first straight line or axis at the center of the framework 6 and at right angles thereto. The first pair of pivotably attaching portions 16 are shafts projecting radially outwardly from the outer peripheral surface of the framework 6 and snugly fit into the corresponding pivotably attaching portions or slots 15 of the intermediate swingable body 7, whereas the second pair of pivotably attaching portions 17 are through-hole type bearing holes formed within the framework 6 and allowing corresponding pivotably attaching shafts 19 of a cup holding frame 18 to be fitted therein.

The cup holding frame 18 is formed in a U-shape and is provided with a pivotably attaching shaft 19 projecting inwardly from each end of the opposing arms thereof. By fitting the pivotably attaching portions or shafts 19 into the corresponding pivotably attaching portions or bores 17, the cup holding frame 18 is pivotably suspended from the holding framework 6.

The holder according to this embodiment is assembled as follows. The base framework 5 is integrally formed with the door 3. The holding framework 6, the intermediate swingable body 7, and the cup holding framework 18 are separately molded. First, the pivotably attaching shafts 19 of the cup holding frame 18 are fitted into the corresponding pivotably attaching portions or bearing bores 17 of the holding framework 6. Then, the pivotably attaching portions or pins 16 of the holding framework 6 are fitted into the corresponding pivotably attaching portions or slots 15 of the intermediate swingable body 7. Thereafter, the pivotably attaching portions or pins 14 of the intermediate swingable body 7 are pivotably fitted into the corresponding pivotably attaching portions or bearing brackets 13 of the base framework 5.

In the assembled container holder of the present invention, the base framework 5, the intermediate swingable body 7, and the holding framework 6 are concentrically arranged in this order with the base framework 5 disposed at the radially outermost position. In other words, the intermediate swingable body 7 is disposed radially inwardly of the base framework 5 and thereafter the holding framework 6 is disposed radially inwardly of the intermediate swingable body 7. These members 5, 7 and 6 are connected with one another by means of the various pivotably attaching portions and are relatively pivotable about these pivotably attaching portions.

Since the pivotably attaching portions of these three annular members 5, 7 and 6 are disposed upon two straight lines or axis crossing each other at the central portions thereof and at right angles thereto, the internal holding framework 6 can be inclined in any direction with respect to the base framework 5.

Since the cup holding frame 18 is pivotably attached to and hung suspended from the holding framework 6 which is able to swing in any direction, it always projects downward under its own weight with the pivotably attaching shafts 19 serving as supporting points. When the cup holding frame 18 is assembled with the holding framework 6, the free ends of the arms are inserted into the space defined between the holding framework 6 and the intermediate swingable body 7 and the pivotably attaching shafts 19 are fitted into the corresponding pivotably attaching portions or bearing bores 17 of the holding framework 6 from positions radially outwardly thereof.

The holder according to the present invention and constructed as described above, moves out of the storage case 1 together with the door 3 when the door 3 is opened, pivoting about the pivotably attaching shaft 4 and at the same time, the cup holding framework 18 achieves its suspended state under its own weight. Therefore, when a cup having a beverage provided therein is placed within the framework 18 from above, the cup holding frame 18 receives the bottom portion of the cup and at the same time, the holding framework 6 holds the body portion of the cup. As a result, the cup is held in its upright posture. Since the weight of the cup is totally placed upon the holding frame 18, the holding frame 18 is held in its vertical posture. Similarly, since the holding frame 18 is vertically suspended from the holding framework 6, the cup can always be held in its vertical posture irrespective of the inclination of the base framework 5.

When not in use, the holder of the present invention can be stored within the storage case 1 together with the base framework 5 simply by closing the door 3. At this time, the hanging cup holding framework 18 abuts against the defining edge lower wall of the storage case 1 pivoting about the pivotally attaching shafts 19, and is disposed substantially horizontally adjacent the undersurface of the base framework 5. Therefore, the cup holding frame 18 can enter into the narrow interior 2 of the storage case 1.

In this embodiment, the retaining projection 8 is engaged with the catch 9 so that the door 3 will not be opened accidentally.

FIGS. 3 through 6 illustrate another embodiment of a cup holding device according to the present invention, in which a drawer type storage auxiliary member or closure is employed instead of the door of the preceding embodiment.

Figure 3:
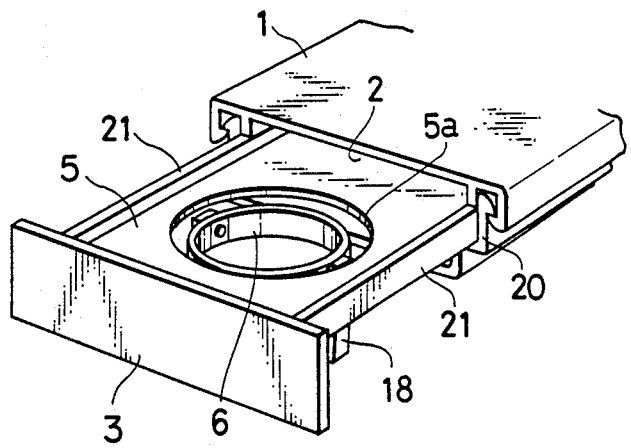
FIG. 3 is a perspective view showing another embodiment of the holder according to the present invention.
Figure 4:
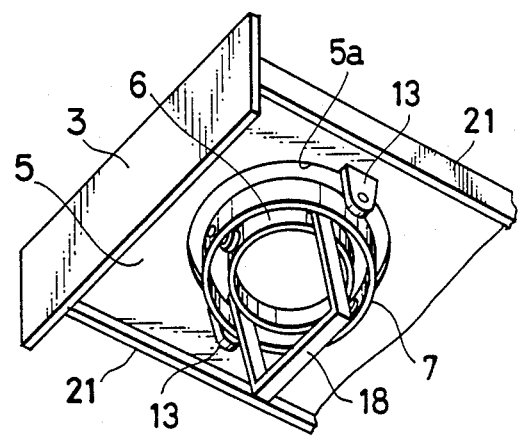
FIG. 4 is a perspective view showing the primary components of the holder of FIG. 3 when viewed from thereunder.
Figure 5:
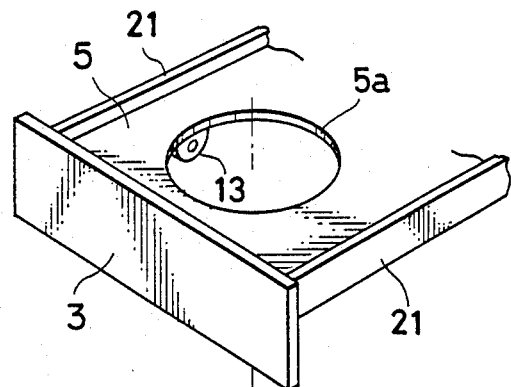
FIG. 5 is an exploded perspective view of the primary components of the holder of FIG. 3.

FIG. 3 is a perspective view showing the storage auxiliary member or closure as including a base plate 5 already moved or projected out from the storage case 1 to its position of use. FIG. 4 is a perspective view of the base plate 5 when viewed from thereunder. FIG. 5 is an exploded perspective view of the holder.

The illustrated base plate 5 is also used as the base framework 5 forming the holder. The base plate 5 has a circular hole 5a at the central portion thereof and is provided with a pair of shaft or brackets attaching portions 13 upon the under-surface thereof and radially outwardly of the peripheral edge portion of hole 5 and with the hole 5a therebetween. The base plate 5 is provided at opposite edge portions thereof with a pair of beams 21 for snugly fitting within a pair of rails 20 provided at opposite inner side surface portions of the storage case 1 and at a front edge portion thereof with a cover plate 3 for closing the opening portion 2 of the storage case 1.

Disposed within the illustrated holding framework 6 are the intermediate swingable body 7 and the cup holding frame 18 which are the same as those described in the preceding embodiment. These members 6, 7 and 18 are pivotably attached through various pivotably attaching portions, and are connected and assembled as shown in FIG. 4.

With the illustrated assembled holder, when the base plate 5 is withdrawn from the storage case 1 the cup holding frame 18 achieves its suspended state under its own weight and can receive a cup placed therein from thereabove.

Figure 6:
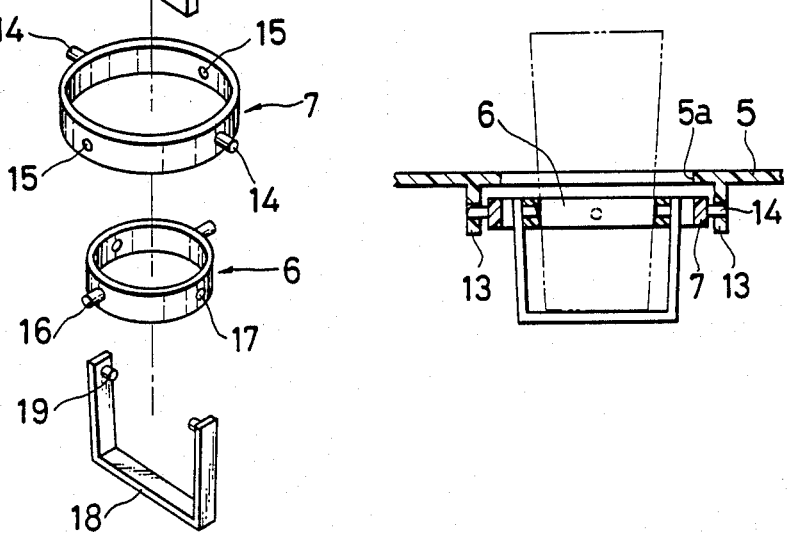
FIG. 6 is a vertical sectional view of the primary components of the holder of FIG. 3.

FIG. 6 illustrates the cup disposed holding frame 18 with a cup therein, wherein the holding frame 18 is held in its vertical posture upon receiving the weight of the cup, while the holding framework 6 holds the body of the cup. Thus, the cup can be held in exactly the same manner as in the preceding embodiment.

When the base plate 5 is not in use, it is pushed into the storage case 1 as it is, the holding frame 18 suspended from the holding framework 6 abuts against the lower edge of the storage case 1 defining opening portion 2 and is then pivoted about the pivotably attaching shafts 19 so as to be brought adjacent to the under-surface of the base plate 5 and is stowed within the case 1 in its collapsed state.

The present invention is constructed and used as described in the foregoing. If the holder is mounted in the vicinity of a dash board or the like of an automobile by fitting the storage case therein, the holder can be easily withdrawn to its position of use by opening the storage auxiliary member closure. Since the cup holding frame is automatically suspended at that time, when a cup is placed therein, it can be held in its correct posture.

According to the holder of the present invention, the holding framework is pivotably supported through means of a number of pivotably attaching portions of the intermediate swingable framework for pivotability in all directions with respect to the base framework integrally secured to the storage auxiliary member or closure, and the cup holding frame is held in its vertically suspended state by means of its own weight and by receiving the weight of the cup therein. Therefore, it does not incline even when the vehicle body inclines. Therefore, the contents do no spill out of the cup when the vehicle sways.

Furthermore, according to the holder of the present invention, the cup holding frame is suspended from the holding framework through the pivotably attaching shafts. Therefore, when the storage auxiliary member or closure, which has been previously opened, is now closed, it is automatically collapsed. Thus, it can be stored by means of a simple operation. Moreover, since the cup holding frame having a three dimensional structure when in use, is collapsed to a flattened state and stored within the narrow storage space, the case can be made compact. Therefore, the holder of the present invention can be located in a narrow or limited space.

Obviously, many modifications and variations of the present invention are possible in light of the above teachings. It is therefore to be understood that within the scope of the appended claims, the present invention may be practiced otherwise than as specifically described herein.

What is claimed is:

1. A drink container holder, comprising:
   a storage case defining an opening, and having a closure member movably mounted thereon between open and closed positions for opening and closing said opening;
   a base framework, having an annular portion defined therein with an aperture defined therethrough, mounted upon said closure member of said storage case;
   an annular holding framework disposed within said annular aperture portion of said base framework;
   an intermediate pivotable body, interposed between said base framework and said holding framework including first and second pairs of pivotably attaching means, the first pair of said pivotably attaching means being provided at diametrically opposed positions upon a first axis, and said second pair of pivotably attaching means being provided at diametrically opposed positions upon a second axis crossing said first axis at a central portion thereof and at right angles thereto, said first and second pairs of pivotably attaching means being pivotably attached to said base framework and said holding framework, respectively; and
   a cup holding frame having a pair of pivotably attaching means at diametrically opposed end portions thereof and pivotably attached to said holding framework in a suspended fashion by pivotably attaching said pivotably attaching means thereto, said cup holding frame, when stowed within said storage case as a result of the closing action of said closure member, being pivoted about said pivotably attaching means so as to be stowed within said storage case.

2. The holder of claim 1, wherein:
   said closure member is a door which is openable and closable, and pivotably supported within said opening portion of said storage case, and said base framework is integrally formed with an interior surface of said door.

3. The holder as set forth in claim 1, wherein:
said closure member is a drawer slidably mounted within said storage case.

4. The holder as set forth in claim 3, further comprising:
beam means formed upon edge portions of said drawer; and rail means fixedly disposed within said storage case upon which said beam means of said drawer slide.

5. The holder as set forth in claim 1, further comprising:
projection means fixedly mounted upon said closure member; and
catch means fixedly mounted upon said storage case for operatively cooperating with said projection means of said closure member so as to retain said closure member in a closed position when said closure member is moved to said closed position.

6. The holder as set forth in claim 1, wherein:
said cup holding frame comprises a substantially U-shaped bail.

7. The holder as set forth in claim 1, wherein:
said annular holding framework and said intermediate pivotable body comprise a pair of gimbal rings.

8. A drink container holder, comprising:
a storage case defining an opening within one sidewall thereof;
a closure member movably mounted upon said storage case between first and second positions respectively opening and closing said opening defined within said sidewall of said storage case;
an annular frame member, having aperture means defined therein and extending therethrough, fixedly mounted upon an interior surface of said closure member;
a first ring member;
means pivotably mounting said first ring member interiorly within said annular frame member and upon said annular frame member about a first pivot axis;
a second ring member;
means pivotably mounting said second ring member interiorly within said first ring member and upon said first ring member about a second pivot axis which crosses said first pivot axis at a central portion thereof and at right angles thereto; and
cup holding means pivotably mounted upon said second ring member between a first position at which said cup holding means is disposed in an operative suspended state for supporting said drink container when said closure member is moved to said open position, and a second position at which said cup holding means is disposed in an inoperative collapsed state for storage within said storage case when said closure member is moved to said closed position.

9. A drink container holder as set forth in claim 8, wherein:
said closure member is a door.

10. A drink container holder as set forth in claim 8, wherein:
said closure member is a drawer.

11. A drink container holder, as set forth in claim 10, further comprising:
rail means fixedly disposed within said storage case; and
beam means formed upon edge portions of said drawer for slidable movement along said rail means for facilitating said movement of said closure member between said open and closed positions.

12. A drink container holder, as set forth in claim 8, further comprising:
projection means fixedly mounted upon said closure member; and
catch means fixedly mounted upon said storage case for operatively cooperating with said projection means of said closure member for retaining said closure member in a closed position when said closure member is moved to said closed position.

13. A drink container holder as set forth in claim 8, wherein:
said cup holding means comprises a substantially U-shaped bail.

14. A drink container holder as set forth in claim 8, wherein:
said first and second ring members comprise a pair of gimbal rings.

15. A drink container holder as set forth in claim 8, wherein:
said annular frame member comprises an annular ring member.

16. A drink container holder as set forth in claim 8, wherein:
said annular frame member comprises a substantially flat plate having a substantially rectangular configuration with said aperture means defined within a substantially central portion thereof.

17. A drink container holder as set forth in claim 8, wherein:
said cup holding means is pivotably mounted upon said second ring member about an axis which is substantially parallel to said first axis about which said first ring member is pivotably mounted within said annular frame member.

* * * * *